United States Patent [19]

Maeda et al.

[11] Patent Number: 4,967,350
[45] Date of Patent: Oct. 30, 1990

[54] PIPELINED VECTOR PROCESSOR FOR EXECUTING RECURSIVE INSTRUCTIONS

[75] Inventors: Akira Maeda; Masahiko Yoshimura, both of Yokohama; Satoru Hashimoto, Kamakura, all of Japan

[73] Assignee: Director General of Agency of Industrial Science and Technology, Tokyo, Japan

[21] Appl. No.: 175,292

[22] Filed: Mar. 30, 1988

[30] Foreign Application Priority Data

Sep. 3, 1987 [JP] Japan .................. 62-219152

[51] Int. Cl.⁵ .................. G06F 9/38; G06F 15/347
[52] U.S. Cl. .................. 364/200; 364/231.8; 364/232.21
[58] Field of Search ........ 364/730, 740, 200 MS File, 364/900 MS File

[56] References Cited

U.S. PATENT DOCUMENTS

| | | | |
|---|---|---|---|
| 4,435,765 | 3/1984 | Uchida et al. | 364/200 |
| 4,525,796 | 6/1985 | Omoda et al. | 364/730 |
| 4,641,275 | 2/1987 | Hatakeyama et al. | 364/900 |
| 4,757,444 | 7/1988 | Aoyama et al. | 364/200 |
| 4,789,925 | 12/1988 | Lahti | 364/200 |
| 4,853,890 | 8/1989 | Abe et al. | 364/900 |

FOREIGN PATENT DOCUMENTS

| | | | |
|---|---|---|---|
| 0213842 | 11/1987 | European Pat. Off. | |
| 0176874 | 10/1984 | Japan | 364/730 |
| 2113878A | 8/1983 | United Kingdom | 364/730 |

OTHER PUBLICATIONS

P. M. Kogge: "The Architecture of Pipelined Computers", 1981, pp. 220-255, section 6.2: Interinstruction Dependencies and Hazards, Hemisphere Publishing Corp., New York, U.S.: *pp. 220-221, line 4; p. 222, lines 19-41*.
Patent Abstracts of Japan, vol. 7, No. 42 (P-177)[1187], Feb. 19, 1983; & JP-A-57 193 842 (Hitachi Seisakusho K.K.) 11-29-1982.

Primary Examiner—Raulfe B. Zache
Attorney, Agent, or Firm—Oblon, Spivak, McClelland, Maier & Neustadt

[57] ABSTRACT

A vector computer includes memory 11 for storing vector data, and arithmetic unit 12 for sequentially reading out the vector data from memory 11, performing vector processing based on a pipeline system, and storing an operation result in memory 11. The vector computer further includes read/write controller 13 for storing white addresses of the memory at which results of operations being performed in stages of a pipeline are to be written, comparing the write addresses with a read address generated by arithmetic unit 12, and when at least one of the write addresses coincides with the read address, detecting that data designated by the read address is being operated in any stage of the pipeline, i.e., is not determined yet, thereby inhibiting reading of the data designated by the read address from memory 11.

8 Claims, 4 Drawing Sheets

| CYCLE | 1 | 2 | 3 | 4 | 5 | 6 | ------ |
|---|---|---|---|---|---|---|---|
| READ | B(1) C(1) | B(2) C(2) | B(3) C(3) | B(4) C(4) | B(5) C(5) | B(6) C(6) | ------ |
| WRITE | | | A(1) | A(2) | A(3) | A(4) | |

| CYCLE | 1 | 2 | 3 | 4 | 5 | 6 | ------ |
|---|---|---|---|---|---|---|---|
| READ | A(1) C(1) | A(2) C(2) | A(3) C(3) | A(4) C(4) | A(5) C(5) | A(6) C(6) | ------ |
| WRITE | | | A(4) | A(5) | A(6) | A(7) | |

| CYCLE | 1 | 2 | 3 | 4 | 5 | 6 | ----- |
|---|---|---|---|---|---|---|---|
| READ | A(1)<br>C(1) | | | A(2)<br>C(2) | | | ----- |
| WRITE | | | A(2) | | | A(3) | |

FIG. 4
(PRIOR ART)
```
    DO  10  I = 1 , 1000
10  A ( I + k ) = A ( I ) + C ( I )
```

FIG. 5A
(PRIOR ART)
```
    SUBROUTINE  SUB ( A , B , C )
    DU  10  I = 1 , 1000
10  A ( I + k ) = B ( I ) + C ( I )
```

FIG. 5B
(PRIOR ART)
```
CALL  SUB ( A , A , B )
```

FIG. 8 {
```
    DO 10 I = 1, 5
10     A(I+3) = A(I) + B(I)
```
}

| CYCLE | 1 | 2 | 3 | 4 | 5 | 6 | 7 | 8 | 9 | 10 | 11 |
|---|---|---|---|---|---|---|---|---|---|---|---|
| READ { | A(1) B(1) | A(2) B(2) | A(3) B(3) | A(4) B(4) | A(4) B(4) | A(4) B(4) | A(5) B(5) | | | | |
| WRITE | | | | | A(4) | A(5) | A(6) | | | A(7) | A(8) |
| FIFO { | A(4) | A(5) A(4) | A(6) A(5) A(4) | A(6) A(5) A(4) | A(6) A(5) A(4) | A(7) A(6) A(5) | A(8) A(7) A(6) | A(8) A(7) | A(8) A(7) | A(8) A(7) | A(8) |

RI

RD

WD

PIPELINED VECTOR PROCESSOR FOR EXECUTING RECURSIVE INSTRUCTIONS

BACKGROUND OF THE INVENTION

1. Field of the Invention

The present invention relates to a vector computer based on vector processing performed by a pipeline method.

2. Description of the Related Art

An operation of repeatedly performing the same operation for vector data regularly stored in a memory is called a vector operation. In Fortran, for example, a vector operation of vectors A, B, and C as shown in FIG. 1A is performed such that processing in which an operation is performed using B(I) and C(I) as operands and an operation result is substituted in destination A(I) is repeatedly performed while suffix I is sequentially changed by a DO loop.

A pipeline method is known as a method of increasing an operation speed of the vector operation. According to the pipeline method in which the number of stages of a pipeline is set to be three, an operation shown in FIG. 1A is performed as shown in FIG. 1B.

First, in cycle 1, addresses of B(1) and C(1) are set as read addresses, and an address of A(1) is set as a write address. Then, B(1) and C(1) are read out, and an operation of B(1)+C(1) is started at a given stage in the pipeline. In this case, assume that this operation requires two cycles.

In next cycle 2, although the operation started in cycle 1 is continuously executed, addresses of B(2) and C(2) are set as read addresses. Then, B(2) and C(2) are read out, and an operation of B(2)+C(2) is started in another stage in the pipeline. In this case, since an operation result of B(1)+C(1) is not obtained yet in cycle 2, the address of A(1) is still set as the write address.

In cycle 3, since result A(1) of the operation started in cycle 1 is obtained, this result is written at the given stage. At the same time, B(3) and C(3) are read out, and an operation of B(3)+C(3) is started in still another stage in the pipeline.

Similarly, in cycle i+2, result A(i) of an operation started in cycle i is obtained. Therefore, A(i) is written, and at the same time B(i+2) and C(i+2) are read out to perform an operation of B(i+2)+C(i+2). When an operation is repeatedly and continuously processed without waiting for a previous operation result as described above, this operation is called vector processing.

According to such vector processing, when two cycles are required for one operation as described above, first operation result A(1) is obtained with a delay of two cycles. However, after the first operation result, an operation result can be advantageously obtained for each cycle.

A recursive operation in which a vector of an operand (A(I)) is the same as that of destination (A(I+3)) as shown in FIG. 2A will be described. Assume that a difference (in this case, three) between suffixes of vector A of the destination and vector A of the operand equals number n (=3) or more of stages of the pipeline. In this case, as shown in FIG. 2B, since result A(4) of an operation of A(1)+C(1) started in cycle 1 is obtained in cycle 2 and written in cycle 3, A(4) can be read out (referred to) in cycle 4. Therefore, such a recursive operation can be vectorially processed.

In a recursive operation, assume that a difference (in this case, one) between suffixes of vector A of the destination and that A of the operand is less than number n (=3) of stages of the pipeline as shown in FIG. 3A. In this case, since operation result A(2) of A(1)+C(1) started in cycle 1 is not obtained yet in cycle 2, A(2) and C(2) cannot be referred to unless writing of this operation result is finished, i.e., cannot be referred to before cycle 4. Therefore, as shown in FIG. 3B, this operation cannot be continuously performed in each cycle, i.e., cannot be vectorially processed.

As described above, even if the pipeline system is adopted, in a recursive operation in which a difference between suffixes of vectors of a destination and an operand is less than number n of stages of a pipeline, vector processing cannot be performed.

Therefore, in order to perform a recursive operation, number n of stages of the pipeline may be stored in a compiler in advance to determine whether the difference between the suffixes is larger than number n of stages of the pipeline upon compiling, thereby determining in accordance with this determination result whether vector processing is performed in this operation. In this case, however, when the number of stages of the pipeline is increased, the compiler must be modified in accordance with a new pipeline stage number. In addition, when computers have the same architecture and only different numbers of stages of pipelines, a compiler corresponding to the number of stages of a pipeline of each computer must be provided, resulting in troublesome manufacture of compilers.

As shown in FIG. 4, when a suffix of a destination includes variable k, variable k is determined not in compiling but in execution. Therefore, even if $k \geq n$ is obtained in execution, it is determined that vector processing is impossible upon compiling.

In a subroutine as shown in FIG. 5A, although a destination and an operand of statement number 10 are not apparently the same, when first and second arguments are accessed as the same argument at a call of a subroutine as shown in FIG. 5B, a problem of recursive data reference as described above is posed. This problem may be solved if the same variable is not assigned to the first and second arguments. However, in this case, generality of the subroutine is lost, and compatibility of the program is reduced.

For this reason, in conventional vector computers, vector processing is not performed at all in recursive operations although it can be performed in some operations. As a result, an operation speed is reduced to a fraction of several tens of that obtained when vector processing is performed.

SUMMARY OF THE INVENTION

As described above, in the conventional vector computers, vector processing is not performed at all when a recursive operation is to be performed. As a result, an operation speed is reduced.

The object of the present invention is to provide a vector computer in which vector processing can be performed in all steps of a recursive operation which can be vectorially processed, thereby significantly increasing an operation speed.

A vector computer according to the present invention comprises a memory for storing vector data, an arithmetic unit for sequentially reading out the vector data from the memory, performing a vector operation of the readout data by a pipeline system, and storing an operation result in the memory, an address register for storing a write address of data which is being operated in each stage of a pipeline in correspondence to the stage of the pipeline, and a read controller for, when it is requested that the arithmetic unit read out the vector data from the memory, determining whether a read address of the data coincides with any of the write addresses stored in the address register, and when a write address coincident with the read address is present, causing the arithmetic unit to stand by for reading out data in the memory designated by the read address.

According to the present invention, a write address of data which is being operated in each stage of the pipeline is stored in a register file in correspondence to the data. Therefore, by referring to the address stored in the register file, it is determined if the data to be written in the address is being operated. For this reason, when it is requested that the arithmetic unit read out data from the memory, a read address of the data is compared with the contents of the register file. When the read address is stored in the register file, the read controller detects that the data to be written in the address is being operated and is not determined yet and causes the arithmetic unit to stand by for reading. On the contrary, when no such stand-by command is generated, the arithmetic unit sequentially reads out vector data from the memory and supplies them to the pipeline. Therefore, vector processing can be performed in all steps which can be vectorially processed.

As described above, according to the present invention, even in a recursive operation, an operation is performed assuming that it can be vectorially processed unless a read inhibit command is generated. Therefore, vector processing can be performed in all steps which can be vectorially processed, and a vector operation speed can be significantly increased.

BRIEF DESCRIPTION OF THE DRAWINGS

FIGS. 1A and 1B are views for explaining pipeline processing performed in a conventional vector computer;

FIGS. 2A and 2B are views for explaining pipeline processing of a recursive operation which can be vectorially processed in a conventional vector computer;

FIGS. 3A and 3B are views for explaining pipeline processing of an example of a recursive operation which cannot be vectorially processed in a conventional vector computer;

FIG. 4 is a view of another example of a recursive operation which cannot be vectorially processed in a conventional vector computer;

FIGS. 5A and 5B are views of still another example of a recursive operation which cannot be vectorially processed in a conventional vector computer;

FIG. 8 is a view of an example of a recursive operation which cannot be vectorially processed in a conventional vector computer.

DETAILED DESCRIPTION OF THE PREFERRED EMBODIMENT

An embodiment of a vector computer according to the present invention will be described below with reference to the accompanying drawings.

Figures 6, 9:
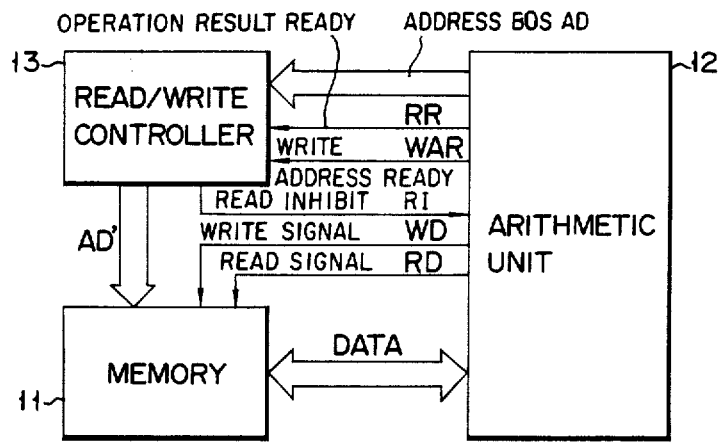
FIG. 6 is a block diagram of an embodiment of a vector computer according to the present invention.
FIG. 9 is a view for explaining an operation in which the recursive operation shown in FIG. 8 is vectorially processed in the embodiment to perform pipeline processing.

FIG. 6 is a block diagram schematically showing an arrangement of a vector computer according to the embodiment of the present invention.

This vector computer comprises: memory (random access memory) 11 for storing vector data; arithmetic unit 12 for sequentially reading out the vector data from memory 11 through data bus DATA, performing vector processing based on a pipeline system, and storing an operation result in memory 11 through data bus DATA; and read/write controller 13 for storing a write address of data which is being operated in each stage of a pipe-line, and inhibiting unit 12 to read out data from memory 11 for a predetermined time in order to cope with a recursive operation which cannot be vectorially processed.

Unit 12 supplies read address RA and write address WA (through address bus AD), operation result READY signal RR, and write address READY signal WAR to read/write controller 13.

Read/write controller 13 supplies read inhibit signal RI to unit 12. Read/write controller 13 also supplies read address RA and write address WA' to memory 11 through address bus AD'.

Unit 12 supplies read signal RD and write signal WD to memory 11.

Figure 7:
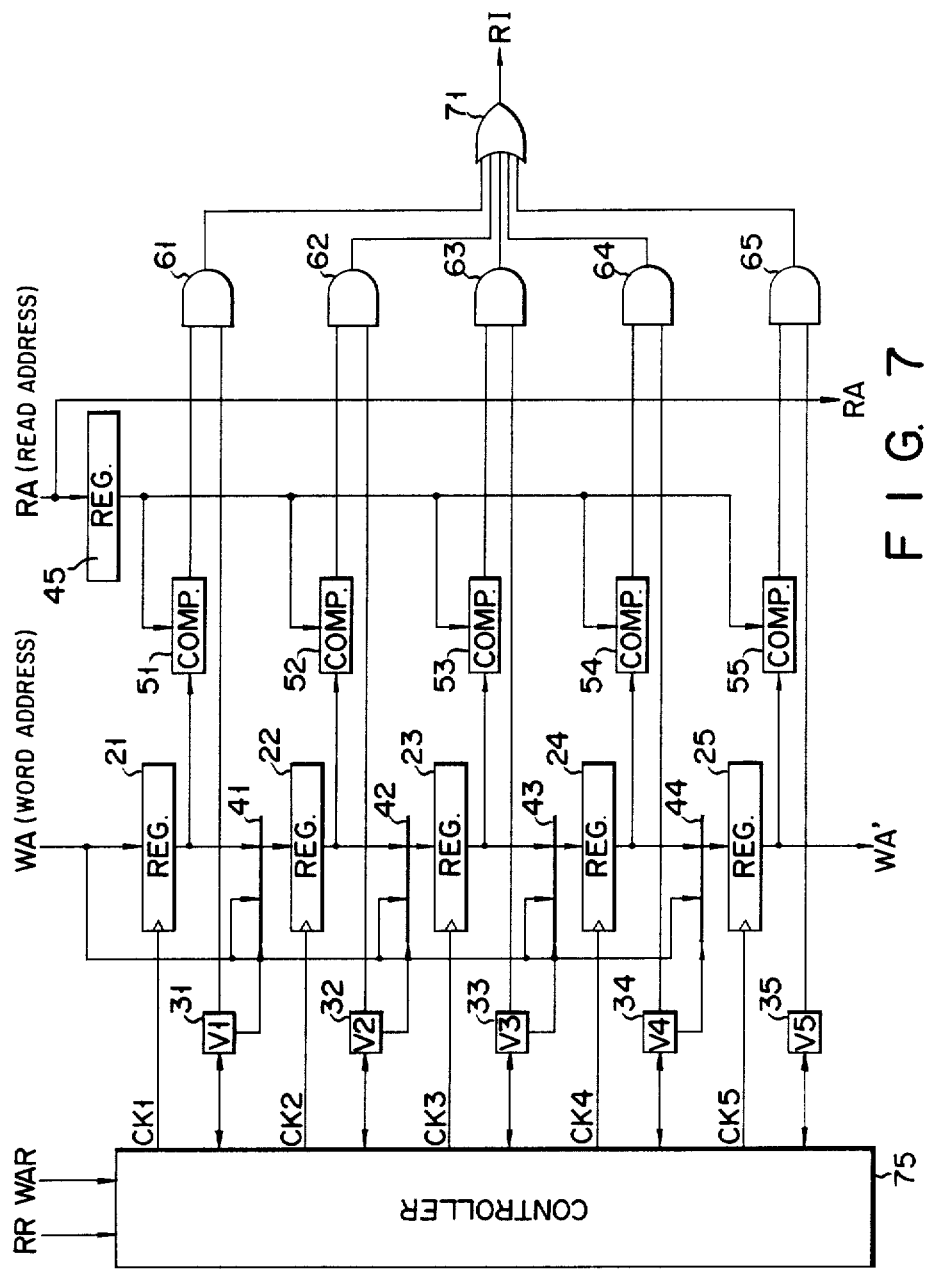
FIG. 7 is a block diagram of a read/write controller in the embodiment.

More specifically, read/write controller 13 is arranged as shown in FIG. 7. In FIG. 7, write address storage registers (to be referred to as WA registers hereinafter) 21 to 25 constitute a FIFO (First-in First-out) register which sequentially stores write addresses WA supplied from unit 12 through address bus AD and outputs them in the order they were stored. The number of stages of this register corresponds to number n of stages of the pipeline in unit 12. In this case, assume that n=5.

Each of WA registers 21 to 25 stores write address WA of data which is being operated in each stage of the pipeline. State registers 31 to 35 are provided in correspondence to WA registers 21 to 25. Each of state registers 31 to 35 is a 1-bit register. "1" is set in each of state registers 31 to 35 by controller 75 when valid data is present (written) in a corresponding one of WA registers 21 to 25, and "0" is set in each of state registers 31 to 35 by controller 75 when data is absent in (read out from) a corresponding one of WA registers 21 to 25. Selectors 41 to 44 are arranged between WA registers 21 to 25, respectively. Each of selectors 41 to 44 selects one of write address WA and a stored value of a corresponding one of WA registers 21 to 24. For example, selector 41 selects the stored value of WA register 21 when the value of state register 31 is "1", and selects write address WA when the value of state register 31 is "0". Similarly, other selectors 42 to 44 select the stored values of WA registers 22 to 24 when state registers 32 to 34 store "1" and select write address WA when state registers 32 to 34 store "0".

Read address RA supplied from unit 12 through address bus AD is stored in read address register (to be referred to as an RA register hereinafter) 45. A stored value of RA register 45 is compared with the stored values of WA registers 21 to 25 by comparators 51 to 55, respectively. Each of comparators 51 to 55 outputs "1" when both the input values coincide with each other.

Outputs from comparators 51 to 55 and state registers 31 to 35 are input to AND gates 61 to 65, respectively. Therefore, each of AND gates 61 to 65 outputs "1" when "1" is set in a corresponding one of state registers 31 to 35, i.e., when valid data is stored in a corresponding one of WA registers 21 to 25 and the valid data coincides with the data of RA register 45. Outputs from AND gates 61 to 65 are input to OR gate 71. OR gate 71 outputs read inhibit signal RI for the memory when any of the outputs from AND gates 61 to 65 is "1".

Controller 75 controls an overall operation of read/write controller 13. Controller 75 outputs clock signals CK1 to CK5 for driving WA registers 21 to 25 in accordance with operation result READY signal RR and write address READY signal WAR from unit 12 and the data in state registers 31 to 35.

An operation of the vector computer according to the embodiment having the above arrangement will be described below.

First, an operation of the FIFO memory will be described. In an initial state, values of state registers 31 to 35 are all "0"s, and it is represented that the data in all WA registers 21 to 25 are invalid. As a result, all selectors 41 to 44 select write address WA.

When write address READY signal WAR and first write address WA are input, controller 75 sets clock CK5 to "1" because all the values of state registers 31 to 35 are "0"s. Therefore, the first write address WA is stored in WA register 25 through selector 44, and at the same time "1" is set in state register 35.

When write address READY signal WAR goes to "1" and next write address WA is input, controller 75 sets clock CK4 to "1" because "1" is set in state register 35. Therefore, the next write address WA is stored in WA register 24 through selector 43. At the same time, "1" is set in state register 34.

As described above, when write READY signal WAR goes to "1", write address WA is sequentially stored in a lowest empty WA register.

An operation performed when an operation result is output from unit 12, i.e., when an operation result is written at a write address in memory 11 designated by data in WA registers 21 to 25 will be described below.

When operation result READY signal RR goes to "1", write address WA' read out from WA register 25 of the lowest stage is used to address memory 11 through address bus AD'. Therefore, register 25 is emptied, and the contents in WA registers 21 to 24 are sequentially supplied to and stored in the lower stages under the control of controller 75.

At this time, if "1"s are set in state registers 34 and 35 and valid data are present in WA registers 24 and 25, an output from WA register 24 is transferred to WA register 25 through selector 44 because "1" is set in state register 34, and "0" is set in state register 34. "1" is still set in state register 35.

When write address READY signal WAR and operation result READY signal RR simultaneously go to "1", write address stored in WA register 25 is fetched, the data in WA registers 21 to 24 are sequentially transferred to and stored in the lower stages 22 to 25, and write address WA is stored in a lowest empty WA register. For example, when "1"s are set in state registers 34 and 35 and valid data ar stored in WA registers 24 and 25, the contents of WA register 25 are read out as a write address WA' of memory 11, the contents of WA register 24 are stored in WA register 25, and write address WA is stored in WA register 24.

More specifically, since "0" is set in state register 33, selector 43 selects and outputs write address WA to WA register 24. Since "1" is set in state register 34, selector 44 selects and outputs the stored contents of WA register 24 to WA register 25. At this time, clocks CK4 and CK5 go to "1", and WA registers 24 and 25 store addresses supplied from selectors 43 and "1"s are still set in state registers 34 and 35.

An operation of controller 75 will be described. Controller 75 controls transfer control signal CKi (i=1 to 5) of WA registers 21 to 25 and value Vi (i=1 to 5) of state registers 31 to 35 in accordance with the following logical equations.

$$CKi = (Vi = 0) \cdot (Vi + 1 = 1) \cdot (RR = 0) \cdot (WAR = 1) + \quad (1)$$

$$(Vi = 1) \cdot (Vi - 1 = 0) \cdot (RR = 1) \cdot (WAR = 1) +$$

$$(Vi = 1) \cdot (Vi - 1 = 1) \cdot (RR = 1)$$

$$Vi = (Vi = 1) \cdot ((RR = 1) \cdot (WAR = 0) \cdot (Vi - 1 = 1) + \quad (2)$$

$$(RR = 1) \cdot (WAR = 1) + (RR = 0) \cdot (WAR = 1) +$$

$$(RR = 0) \cdot (WAR = 0)) +$$

$$(Vi = 0) \cdot (Vi + 1 = 1) \cdot (RR = 0) \cdot (WAR = 1)$$

where V0=0 and V6=1.

In this case, a logical equation of (Vi=0) represents that a truth, i.e., "1" is obtained when Vi=0. A circuit for performing such a logical operation can be easily realized by a general logic IC, and therefore its detailed arrangement is omitted. As described above, 5 WA registers 21 to 25 operate as a FIFO. In the above description, the number of stages of the pipeline is five and the number of stages of the corresponding FIFO in read/write controller 13 is also five. However, it is apparent that this invention can be applied to the pipeline having any number of stages.

In a data read operation, read address RA is stored in RA register 45. This address stored in RA register 45 is compared with the contents in WA registers 21 to 25 by comparators 51 to 55, respectively. When at least one of the contents coincides with the read address unless the content is invalid, i.e., the value of the corresponding state register is "0", read inhibit signal RI is output through a corresponding one of AND gates 61 to 65 and OR gate 71. When read signal RI is input to unit 12, unit 12 stands by for reading out vector data of memory 11 designated by a read address. That is, when the vector data of memory 11 designated by the read address is being operated and hence its value is not stored in memory 11 yet, i.e., when its write address is stored in any of WA registers 21 to 25, unit 12 stands by for reading out the data.

An operation performed when a DO loop for a recursive operation as shown in FIG. 8 which cannot be vectorially processed in conventional techniques is executed in the above vector computer will be described below. Since difference "3" between suffixes of a destination and an operand of statement number 10 is smaller than number "5" of stages of the vector computer, this Fortran program is not vectorially processed in conventional vector computers. However, in this vector computer, this program can be vectorially processed as shown in FIG. 9.

That is, in cycle 1, in order to execute A(4)=A(1)+B(1), unit 12 outputs a read request of A(1) and B(1) and checks whether memory 11 can be read out. This operation is performed by setting the address of data A(1) in RA register 45 shown in FIG. 7 and comparing it with the data of WA registers 21 to 25 by comparators 51 to 55, respectively.

Note that with the arrangement of FIG. 7, read addresses of only an A(I) system can be checked. In order to similarly check a B(I) system, a FIFO (equivalent to RA registers 21 to 25, state registers 31 to 35, and selectors 41 to 44), circuits equivalent to comparators 51 to 55, and circuits equivalent to AND gates 61 to 65 may be provided, and outputs from all AND gates may be output as an RI signal through OR gate 71. However, since the operation shown in FIG. 8 is considered as an example of a recursive operation here, recursive data reference is generated with respect to only vector A(I). Therefore, circuits for checking the B(I) system are not shown.

In cycle 1, since no data valid as a write address is present, read inhibit signal RI goes to "0". When RI is "0", data to be read out is determined. Therefore, read signal RD goes to "1", and A(1) and B(1) are read out from memory 11, thereby starting the operation. In order to store an operation result obtained in the fourth stage in A(4), an address of A(4) is stored in a FIFO section.

In cycles 2 and 3, since read data A(2), B(2), A(3), and B(3) are determined as in cycle 1, RI goes to "0" to start the operation, and write addresses of A(5) and A(6) are stored in the FIFO section, respectively. Therefore, at the end of cycle 3, the write addresses of A(4), A(5), and A(6) are sequentially stored in write registers 23, 22, and 21 of the FIFO section.

Then, in cycle 4, unit 12 outputs memory read requests of A(4) and B(4). Since A(4) is stored in WA register 23 of the FIFO section, "1" is set in comparator 53, and read inhibit signal RI goes to "1". Therefore, unit 12 determines that data A(4) is not determined yet and stands by for reading out A(4) from memory 12 until read signal RD goes to "0".

In cycle 5, the operation of A(1)+B(1) started in cycle 1 is completed, and write signal WD goes to "1" to write an operation result in A(4). In this cycle, since A(4) remains in the FIFO section, read inhibit signal RI is still "1", and a read stand-by state is maintained.

In cycle 6, an operation result of A(2)+B(2) started in cycle 2 is written. Since A(4) is output from the FIFO section in a transition from cycle 5 to 6, read inhibit signal RI goes to "0", and A(4) can be read out. Therefore, an instruction of A(7)=A(4)+B(4) is activated, and write address WA of A(7) is stored in the FIFO section.

In cycle 7, an operation similar to that in cycle 6 is performed.

As described above, in the vector computer according to the embodiment of the present invention, all steps of the operation can be vectorially processed except that reading of A(4) is delayed by two cycles, thereby efficiently performing the operation. In addition, according to this vector computer, even in an operation in which a recursive reference relationship is generated, a vector operation can be executed regardless of whether the operation can be vectorially processed.

Note that the present invention is not limited to the above embodiment. For example, the number of stages of the WA registers or the number of the RA registers and the comparators can be arbitrarily changed. The present invention can be variously modified without departing from the spirit and scope of the invention.

As has been described above, according to the present invention, in a vector computer for performing vector processing based on a pipeline system, vector processing can be performed in all steps which can be vectorially processed even in a vector operation having a recursive reference relationship. Therefore, the vector operation can be performed at extremely high speed.

What is claimed is:

1. A vector computer comprising: memory means for storing vector data, each vector data comprising vector components;
   a pipelined arithmetic unit for reading out, in a plurality of stages, the vector components from said memory means by using a read address, performing vector operating on the vector components read from said memory means, each vector component being vector-operated at each stage of said of the pipelined arithmetic unit, and storing operation results of respective stages in said memory means by using write addresses; and
   read control means for storing the write addresses from said pipelined arithmetic unit used for writing the operation results of the respective stages, comparing the read address from said pipelined arithmetic unit with the write addresses stored, and inhibiting a read out operation of the pipelined arithmetic unit when it is detected that the read address coincides with at least one of the write addresses stored.

2. A computer according to claim 1, in which said read control means comprises:
   a shift-register for receiving and storing the write addresses from said arithmetic unit, the number of shift-stages of said shift-register being equal to the number of stages of said pipelined arithmetic unit;
   a read address register for receiving and storing the read address from said arithmetic unit; and
   read inhibit signal generating means for comparing a plurality of data in said shift-register and data in said read address register, and when at least one of the data in said shift-register coincides with the data in said read address register, generating a read inhibit signal.

3. A computer according to claim 2, in which said read control means further comprises:
   state registers for storing data denoting whether data is stored in each shift-stage of the shift register;
   selectors, each connected between two shift-stages of said shift-register, having two input terminals and an output terminal, each for selecting and outputting the write address from the pipelined arithmetic unit, or the write address stored in the shift-stage connected to the input terminal thereof, to the shift-stage which is connected to the output terminal thereof; and
   a controller for setting data corresponding to an operation result ready signal and a write address ready signal generated by said pipelined arithmetic unit in said state registers as well as for supplying a transfer control signal corresponding to the operation result ready signal and the write address ready signal to said shift-register.

4. A computer according to claim 3, in which said controller sets following data Vi (i=1 to n) in the i-th state register and supplies following transfer control signal CKi to the i-th shift-stage of said shift-register:

$$Vi = (Vi = 1) \cdot ((RR = 1) \cdot (WAR = 0) \cdot (Vi - 1 = 1) +$$

$$(RR = 1) \cdot (WAR = 1) + (RR = 0) \cdot (WAR = 1) +$$

$$(RR = 0) \cdot (WAR = 0)) +$$

$$(Vi = 0) \cdot (Vi + 1 = 1) \cdot (RR = 0) \cdot (WAR = 1)$$

$$CKi = (Vi = 0) \cdot (Vi + 1 = 1) \cdot (RR = 0) \cdot (WAR = 1) +$$

$$(Vi = 1) \cdot (Vi + 1 = 0) \cdot (RR = 1) \cdot (WAR = 1) +$$

$$(Vi = 1) \cdot (Vi = 1 = 1) \cdot (RR = 1)$$

where n is the number of stages of said pipeline, i being 1 at the input side of the register, V0 and Vn+1 being set to 0, PR is the operation result ready signal, WAR is the write address ready signal, and a logical equation (xx=0) represents that a truth is obtained when xx=0.

5. A computer according to claim 3, in which said read inhibit signal generating means comprises:
   comparators for comparing a plurality of data at the respective stages of said shift-register with data of said read address register; and
   AND gates each for receiving a comparison result from one of said comparators and an output from a corresponding one of 6. A vector computer comprising:
   memory means for storing vector data, comprising vector components;
   a pipelined arithmetic unit for performing vector operations on the vector components read out from said memory means and storing operation results in said memory means, said arithmetic unit comprising means for determining whether the vector component to be read out from said memory means is already vector-operated and written into said memory means, and means for delaying the reading of the vector component when it is determined that the vector component to be read out is not yet vector-operated and written into said memory means.

7. A computer according to claim 6, in which said determining means comprises;
   means for storing write addresses of the vector component, which are vector-operated in said pipelined arithmetic unit; and
   means for comparing read address of the vector component to be read out from said memory means and the write addresses stored in said storing means.

8. A computer according to claim 7, in which said storing means comprises a shift-register having registers which are equal in number to stages of the pipeline of the arithmetic unit.

* * * * *